(12) United States Patent
Venkatesan et al.

(10) Patent No.: US 7,664,258 B2
(45) Date of Patent: Feb. 16, 2010

(54) RANDOMIZED SPARSE FORMATS FOR EFFICIENT AND SECURE COMPUTATION ON ELLIPTIC CURVES

(75) Inventors: Ramarathnam Venkatesan, Redmond, WA (US); David Y. Jao, Bellevue, WA (US); Peter L. Montgomery, Bellevue, WA (US); S Ramesh Raju, Bangalore (IN)

(73) Assignee: Microsoft Corporation, Redmond, WA (US)

(*) Notice: Subject to any disclaimer, the term of this patent is extended or adjusted under 35 U.S.C. 154(b) by 798 days.

(21) Appl. No.: 11/275,372

(22) Filed: Dec. 28, 2005

(65) Prior Publication Data

US 2007/0189511 A1 Aug. 16, 2007

(51) Int. Cl.
*H04L 9/28* (2006.01)
*H04L 9/30* (2006.01)
(52) U.S. Cl. .................. 380/28; 713/174; 713/189
(58) Field of Classification Search ............ 380/255, 380/257, 259, 260, 262, 264, 267, 268, 273, 380/37, 42, 43, 277, 278, 279, 280, 281, 380/282, 283, 284, 285, 286, 44, 45, 28, 380/29, 30; 726/2, 3, 4, 5, 6, 7, 8, 9, 10, 726/14, 17, 20, 21, 27; 713/1, 150, 151, 713/152, 153, 154, 161, 166, 167, 169, 171, 713/172
See application file for complete search history.

(56) References Cited

U.S. PATENT DOCUMENTS

| 4,969,189 | A  | * | 11/1990 | Ohta et al. ................... 713/180 |
| 6,141,420 | A  | * | 10/2000 | Vanstone et al. .............. 380/30 |
| 6,307,935 | B1 | * | 10/2001 | Crandall et al. ............... 380/28 |
| 6,904,526 | B1 | * | 6/2005  | Hongwei .................... 713/182 |
| 2002/0076044 | A1 | * | 6/2002 | Pires .......................... 380/37 |
| 2002/0178371 | A1 | * | 11/2002 | Kaminaga et al. ........... 713/189 |
| 2003/0081769 | A1 | * | 5/2003 | Hamilton ..................... 380/28 |
| 2003/0123668 | A1 | * | 7/2003 | Lambert et al. ............. 380/277 |

OTHER PUBLICATIONS

Avoine et al.,; "Advances in Alternative Non-Adjacent Form Representations"; The 5th International Conference on Cryptology in India—Indocrypt 2004, Dec. 20-22, 2004; 1 page.

\* cited by examiner

*Primary Examiner*—Taghi T Arani
*Assistant Examiner*—Kenneth Chang
(74) *Attorney, Agent, or Firm*—Lee & Hayes, PLLC (57) ABSTRACT

Techniques are described that facilitate cryptographic operations, such as data encryption, signing and others, encryption using a computerized method for multiplying a scalar by a point. In one implementation, a set of random integers is selected, wherein the set comprises at least one integer selected randomly. A string is configured, based in part on the set of random integers. Output in the form of a product of the scalar and the point is then calculated, based on the string.

16 Claims, 6 Drawing Sheets

100 SCALAR-POINT MULTIPLICATION MODULE

102 PRE-PROCESSOR

106 SCALAR-POINT MULTIPLICATION PREPROCESSING

108 RANDOM SET CONFIGURATION MODULE

110 RSF(k, X) (RANDOM SPARSE FORMAT) FUNCTION

112 CHARACTER CONCATENATION FUNCTION

114 INTERMEDIATE SCALAR VALUE CALCULATION

116 RANDOM VALUE COMPENSATION CALCULATION

104 SCALAR-POINT PRODUCT CALCULATION MODULE

RANDOMIZED SPARSE FORMATS FOR EFFICIENT AND SECURE COMPUTATION ON ELLIPTIC CURVES

BACKGROUND

Many cryptographic protocols employ operations wherein a point on an elliptic curve is multiplied by large scalar values. In order to cut down on such computationally demanding operations, double and add algorithms are frequently employed to multiply the point by the scalar. In a further development, a non-adjacent digit set (NADS) can be used to optimize arithmetic operations performed on elliptic curves in cryptographic applications. For example, the set $\{-1, 0, 1\}$ provides options not seen in the conventional binary number system whose digits are $\{0, 1\}$.

Recently, use of digit sets having the format $\{0, 1, x\}$ where x is a negative integer has been explored. This technology has resulted in increased computational efficiency of calculations involving multiplication of large integers and elliptic curve points. Unfortunately, while computational efficiencies have increased, such algorithms continue to be subject to side-channel attacks. The existing literature typically involves very small values of x, which limit the amount of randomness that can be entered into the computation.

SUMMARY

Techniques are described that facilitate cryptographic operations, such as data encryption, signing, authentication, key exchange, hashing and others, using a computerized method for multiplying a point by a scalar. Such an operation is common in cryptographic systems, such as for signature and encryption, where our techniques can be combined with other operations. In one implementation, a set of random integers is selected, wherein the set comprises at least one integer selected randomly. A string is configured, based in part on the set of random integers. Output in the form of a product of the point and the scalar is then calculated, based on the string.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
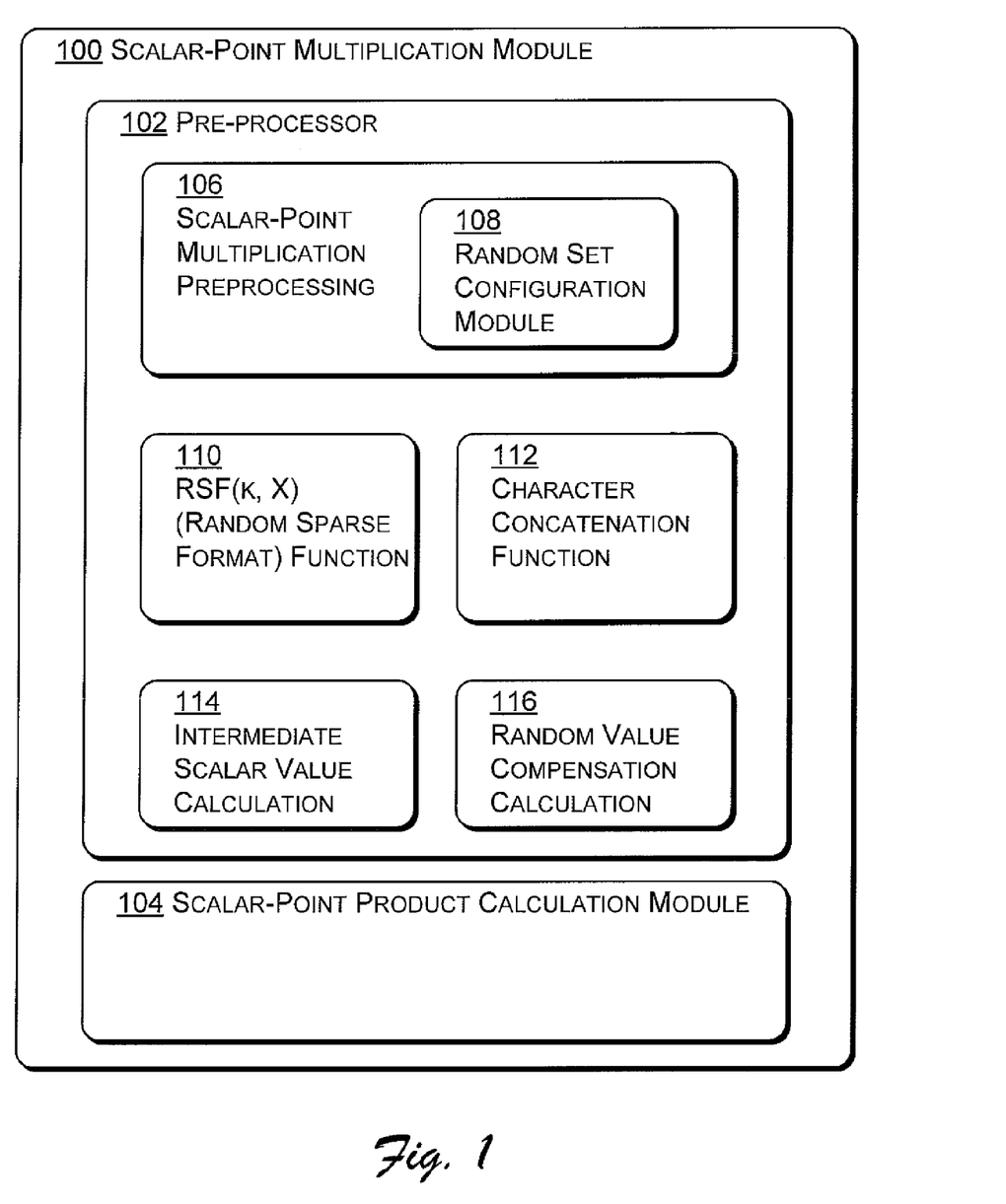
FIG. 1 is a block diagram illustrating an example of a module implemented in software or hardware for multiplying a point by a scalar value on an elliptic curve.

The following discussion is directed to systems and methods that utilize cryptographic operations, such as encryption, signing, authentication, key exchange, hashing and others. Such systems and methods operate in part by multiplying a point P on an elliptic curve by a scalar value k, thereby obtaining a scalar-point product. The multiplication is characterized by use of a set of randomly generated numbers when creating a string associated with the scalar k. In one example of an implementation of the systems and methods discussed herein, FIG. 1 shows a module 100 configured for encrypting data in part by multiplying a point on an elliptic curve by a scalar. The scalar-point multiplication module 100 may be based on software, firmware or hardware, such as an application specific integrated circuit (ASIC). The modules 102-116 shown within the multiplication module 100 are defined primarily to facilitate description of ideas and concepts, and as such, are representative of example structures and methods of operation. The modules 102-116 are not meant to imply that any of the described functionality must be combined, and/or separated, as shown. For example, while a preprocessor 102 and a calculation module 104 are seen, the preprocessing and calculation functionality could be combined, further segmented or alternatively arranged and distributed between any number of software or hardware structures, as required and/or desired. Therefore, the structure, function and arrangement of modules 100 116 can be altered, merged, segregated, arranged and/or otherwise configured to meet the needs of any application. Accordingly, the example of FIG. 1 is representative of a possible, but not required, structural arrangement.

In the example implementation of FIG. 1, the scalar-point multiplication module 100 includes a pre-processor 102 and a point-scalar product calculation module 104. As an overview, the pre-processor 102 of FIG. 1 is configured to establish a set containing one or more randomly generated integers and to generate a string, based in part on the random integers. The point-scalar product calculation module 104 is configured to use the string, containing coefficients of a polynomial evaluated at of powers of two, in calculating the point-scalar product.

Referring to FIG. 1, a scalar-point multiplication preprocessing module 106 is configured to perform preliminary functions, prior to calculation of the product of the scalar k and the point P, i.e., the point Q=kP. One example of the tasks performed by the scalar-point multiplication preprocessing module 106 is seen in a method 200 of FIG. 2. The method 200 of FIG. 2 may be configured as software instructions, which may be defined on any type of media 202. Alternatively, the method 200 may be configured as firmware or hardware (e.g., as an ASIC (application specific integrated circuit)).

We now describe a strategy to modify the RAF computing algorithm for the base $\{0, 1, x\}$ so as to control the length of the representation we get as desired and ensure the length of the representation is bounded. That is, the elements of the set can be used as the coefficients of powers of two, thereby creating a term representing a selected value, wherein the term is of desired and bounded length that will fit within an acceptably-sized memory allocation. When the value of the loop index t reaches a value having magnitude less than the magnitude of x/3, any of several options may be employed. One option is to default to standard binary or some other fixed notation. For small values of x this will not alter the sparsity of the representation, but may not be desirable for security applications. Consistent with this option, we replace x by a smaller value f(x) or a random value in the interval of length g(f(x)) centered around f(x). For example f(x)=round(x/C)+1, for some constant C and g(y)=y/4. Another example is f(x)=round(x0.75) When a random set X has more than one element, we apply this strategy to each of the random elements when they are being used in updating t.

Figure 2:
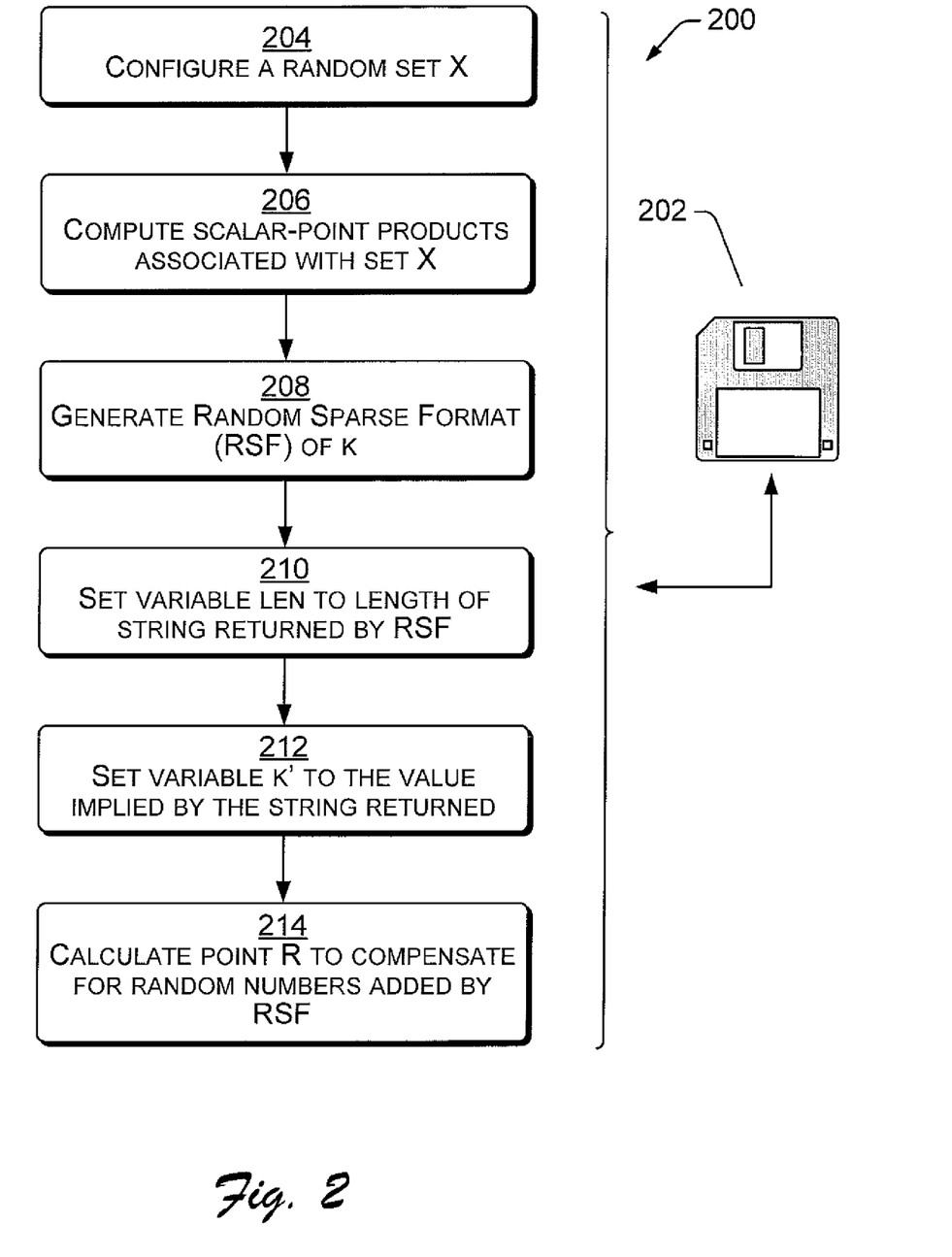
FIG. 2 illustrates an example of a method by which pre-processing of scalar-point multiplication can be performed.

At block 204, a random set X is configured. In the example of FIG. 1, a random set configuration module 108 establishes a set X to include at least one element that is a negative integer, wherein the negative integer typically has a magnitude between 2 and the cube root of k (i.e., $\sqrt[3]{k}$), where k is the scalar to be multiplied by the point P. The number of random numbers can be fixed at a value set by the configuration module 108. In the example that follows, the set is configured to include three random numbers (i.e., the set X={x, y, z}). However, the random set X can be generalized by considering any NADS (Non-Adjacent Digit Set) of the form X={$x_1$, $x_2$, ..., $x_c$}, where c is a positive integer of arbitrary size. The random set generation module 108 is typically configured to provide some constraints on the elements of the set. In one implementation, the set X is selected so that values of elements included are negative integers, each having a magnitude that is between 2 and the cube root of k (i.e., $\sqrt[3]{k}$), where k is the scalar to be multiplied by the point P. Alternatively, other bounds could be used for the elements of the set X, provided they are consistent with available computational resources and other system constraints. While the number of elements in the set X can be preordained by the random set configuration module 108, this count may alternatively be selected randomly. Where random selection is employed, an upper bound on the number of elements selected should be fixed in a manner consistent with available computational resources and other system constraints. However, in the example seen in block 204, a random set X is configured to include 3 elements, i.e. to X={x, y, z}, where x, y and z are negative integers with magnitude between 2 and $\sqrt[3]{k}$, and where k is the scalar to be multiplied by the point P.

At block 206, scalar-point products associated with the set X are computed. In the example of FIGS. 1 and 2, where the set X={x, y, z}, the scalar point products calculated are A=xP, B=yP and C=zP. In a more general sense, where the elements of X are {$x_1$, $x_2$, ..., $x_n$}, then the scalar products calculated by the preprocessor 102 (FIG. 1) are $A_1$=$x_1$P, $A_2$=$x_2$P ..., $A_n$=$x_n$P. Because the values $x_i$ are smaller than k, the calculation of these scalar products is less computationally demanding than the calculation of the original product kP and hence the two calculations may be performed via different methods. For example, these calculations may be performed securely via traditional algorithms using some offline device or with separate carefully written code that may be slow in speed; they may also be computed once and then used for many different values of k in order to amortize the cost of this preprocessing step over several executions of the algorithm.

At block 208, a random sparse format (RSF) string of the scalar k is generated. In the example of FIG. 1, the function 110 is a RSF generator, having as input the scalar k and the set X. As output, the RSF function 110 creates a string, herein arbitrarily designated by str, which is associated with the value of k, as expressed using the set X. Note that if some randomness is introduced during the calculation of the string str, then the value of str may be more properly associated with a value k', which differs from k due to the randomness introduced. An example of the operation of the RSF function 110 of FIG. 1 is seen in FIG. 3.

At block 210, a variable, herein arbitrarily designated by len, is set to the length of the string str returned by the RSF function 110. At block 212, a scalar variable k' is set to the value implied by the string str returned by the RSF function 110. Note that the string str represents coefficients of powers of two. Accordingly, the value of str representing the scalar variable k' is easily calculated. At block 214, a point, herein arbitrarily designed by R, is calculated, based on k, k' and P. In particular, a difference between k and k' is set, e.g. set, β=k−k'. Then, R is calculated as R=βP. Thus, R expresses the product of P and the difference between the scalar k, and the scalar k' associated with the string str. Accordingly, R is suited for later use in removing the randomness from calculation of the string str. Recall that the randomness introduced in the generation of str is why str does not exactly comprise the coefficients of powers of two required to generate k.

Figure 3:
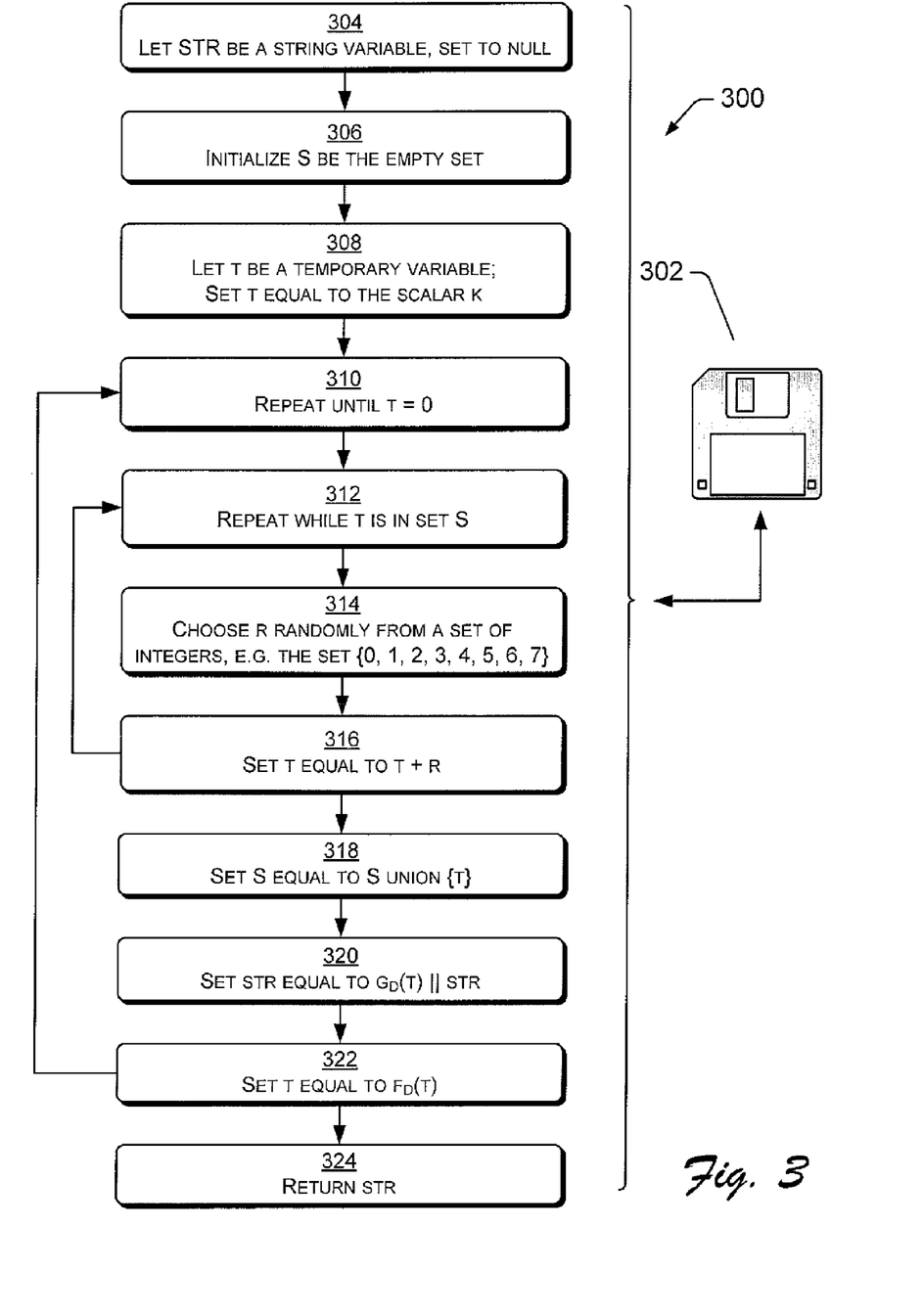
FIG. 3 illustrates an example of a method by which a string can be generated according to a random sparse format.

One example of the operation of the RSF function 110 (FIG. 1), also seen at block 208 of FIG. 2, can be seen by examination of the method 300 of FIG. 3, wherein a random sparse format of the scalar is generated. The RSF function 110 is implemented in processor-executable instructions on media 302; however, the method 300 may alternatively be implemented in firmware or hardware, as desired. In blocks 304-308, preliminary settings are performed. At block 304, the string variable str is set to null. At block 306, the set S is initialized to the empty set. At block 308, a temporary variable t is initialized equal to the scalar k.

At block 310, a loop is entered, wherein the loop repeats until the variable t is equal to zero. At block 312, a second loop, nested within the first loop, is entered. The loop is repeated while the variable t is in the set S. As a practical matter, in most applications the first loop will execute a number of times before the second loop is entered. In particular, since the second loop executes only when t is in S, the second loop cannot execute on the first pass through the first loop, since S is initially empty. At block 314, within the nested second loop, the variable r is selected randomly from a fixed set of integers. In the example of block 314, the set is {0, 1, 2, 3, 4, 5, 6, 7} but other implementations can use large sets containing this set when reduction is done modulo some other integer N instead of 8. Alternatively, other sets having different elements and different numbers of elements could be configured. However, note that having eight elements in the set is related to the use of the mod 8 operator in the calculations of functions f and g in FIGS. 4 and 5, respectively. Therefore, a change in the set of block 314 should be coordinated with the functions f and g. At block 316, the variable t is set to t+r. Thus, in the event that t is in the set S, the variable t is changed by the value of r. Note that for t to be in the set S, the same variable t was set to the same value on a previous pass through the first loop (i.e. the loop starting at block 310).

At block 318, the set S is set to include the elements of S union {t}, i.e. the integer currently contained by the variable t is added to the set S.

Figure 4:
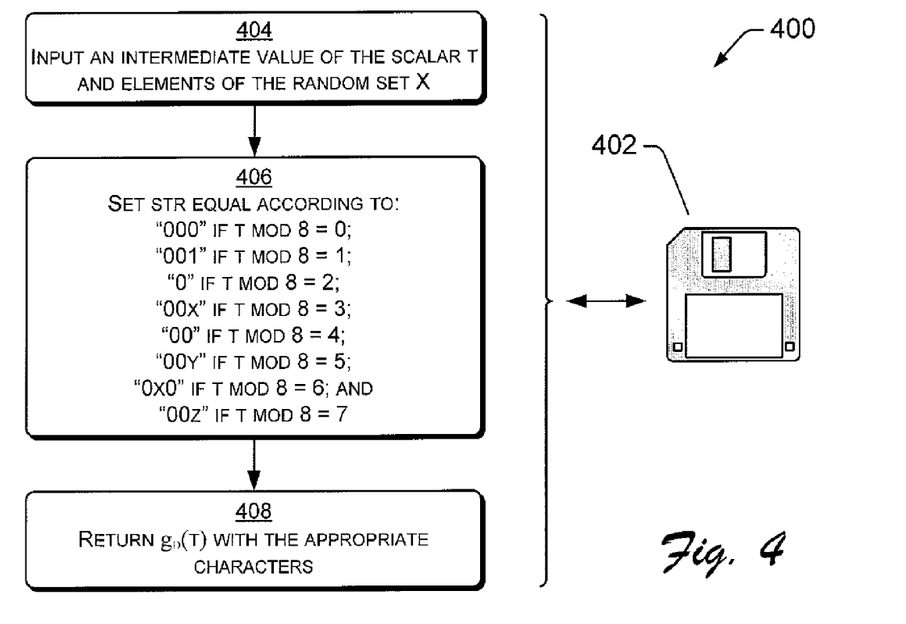
FIG. 4 illustrates an example of a method by which an intermediate value of the scalar k can be calculated during generation of the string created in FIG. 3.

At block 320, the string str is concatenated behind the value of $g_D$(t); i.e., set str=$g_D$(t)||str, where || is a concatenation function. The function $g_D$(t) is seen in FIG. 4, and is discussed infra. The function $g_D$(t) evaluates the variable t mod 8, and derives one or more characters which are inserted before those already present in the string str. The character set typically includes characters representing zero, one and/or elements from the random set X set at block 204 in FIG. 2, by the random set generator 108 of FIG. 1. For example, one or more of the characters '0', '1', 'x', 'y' and/or 'z' are inserted before the characters currently in the string str, where the characters 'x', 'y', 'z' represent the negative integers x, y and z, respectively, as selected by the random set generation module 108. The characters selected are based on the value of the scalar variable t mod 8. Note that use of mod 8 and characters derived from the set X are for purposes of example, and that variations on this implementation may be used where applications warrant. Such variations can include a modulo operation by other than eight, or a random set other than X={x, y, z}. An example of the function $g_D(t)$ will be described more fully with reference to FIG. 4, below.

Figure 5:
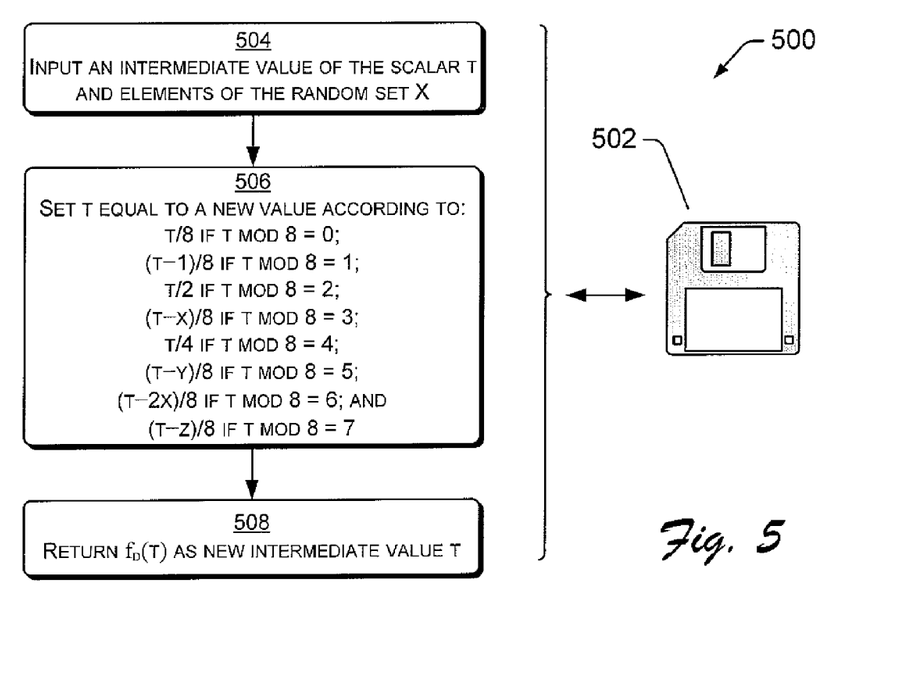
FIG. 5 illustrates an example of a method by which characters can be calculated for concatenation to the string created in FIG. 3.

At block 322, the variable t is set according to the function $f_D(t)$, as seen in FIG. 5, and discussed infra. The function $f_D(t)$ evaluates the variable t mod 8, and derives a new value for t based in part on the result of this calculation and the elements of the set X. Note that use of mod 8 and use of integers associated with the set X are for purposes of example, and that variations on this implementation may be used where applications warrant. Such variations can include a modulo operation by other than eight, or a random set other than X={x, y, z}. An example of the function $f_D(t)$ will be described more fully with reference to FIG. 5, below.

At block 324, the new value of the string variable str is returned. Note that the string str includes characters which are the coefficients of a polynomial based on powers of two.

In the example of FIG. 1, the RSF function calls a character concatenation function 112. This is seen at block 320 of FIG. 3, wherein the RSF function 110 calls a function $g_D(t)$ to concatenate additional characters to the string str. One example of how the additional characters may be obtained is seen in the method 400 FIG. 4, which may be implemented in software 402, firmware, hardware (e.g. as an ASIC) or in any media and/or configuration, as required and/or desired. In particular, the method 400 is based on an assumption that the set of random numbers is X={x, y, z}. Changes to the set X would result in appropriate changes to the method 400. At block 404, an intermediate value of the scalar t and character representatives of elements of the random set X are input. (Note that the first time the function $g_D(t)$ is called, the value of t will be the value of the scalar k. Subsequent time(s) the function $g_D(t)$ is called, the value of t will be intermediate between the initial value of the scalar k and the value zero.) At block 406, the value of t mod 8 is evaluated and found to be equal to an integer value in the range 0-7, thereby setting the value of the function $g_D(t)$ to '000', '001', '0', '00x', '00', '00y', '0x0' or '00z', respectively. At block 408, the function $g_D(t)$, set according to the value of t mod 8, is returned. While FIG. 4 shows one method by which characters may be selected for the function g, other methods are available and should be used, particularly if the set X is changed.

In the example of FIG. 1, the RSF function calls an intermediate scalar value calculation function 114. This is seen at block 322 of FIG. 3, wherein the RSF function 110 called a function $f_D(t)$ to calculate a new or intermediate value for the variable t. One example of how the new value may be calculated is seen in the method 500 FIG. 5, which may be implemented in software 502, firmware, hardware (e.g. as an ASIC) or in any media and/or configuration, as required and/or desired. At block 504, an intermediate value of the scalar t and elements of the random set X are input. (Note that the first time the function $g_D(t)$ is called, the value of t will be the value of the scalar k. Subsequent time(s) the function $g_D(t)$ is called, the value of t will be intermediate between the initial value of the scalar k and the value zero. After the function 114 using the method 500 returns a zero, the RSF function 110 will not recall the function 114 again.) At block 506, the value of t mod 8 is evaluated and found to be equal to an integer value in the range 0-7, thereby setting the string variable t to t/8, (t−1)/8, t/2, (t−x)/8, t/4, (t−y)/8, (t−2x)/8, and (t−z)/8, respectively. At block 508, the variable t, set according to the value of t mod 8, is returned. While FIG. 5 shows one method by which the variable t may be set, other methods are available, and depend in part upon the choice of the set X.

The discussion of the operation of method 300 can be recapped using a very simple example. Suppose that the scalar k=11 and that the set X={−5, −3, −7}. Initially, the string str is set to null (empty). At block 312, t (which assumed the value of k) is not in S, which was initially set to empty. Therefore, the inner (nested) loop is skipped. At block 318, 11 is inserted in set S. At block 320, the function $G_D(t)$ recognizes 11 mod 8 is 3. Therefore, evaluation yields $g_D(11)$='00x'. Additionally, $g_D(11)$=(11−(−5))/8=2. Thus, the intermediate value of the scalar t is 2 and str is currently '00x'. In a second loop, at block 310, t≠0 and so the loop continues. The inner loop again fails to execute, since S includes only 11, and t is now 2. At block 318, S is expanded to include 2 and 11. At block 320, $g_D(2)$='0' and in evaluating $f_D(2)$, we see that 2 mod 8 is 2, and 2/2 is 1. Therefore, str='0'∥'00x' or '000x', and t=1. Back at block 310, t is still not 0, and the loop continues. The variable t is 1, which is not in S, so the inner loop again fails to execute. At block 318, the set S is expanded to include 1, 2 and 11. At block 320, $g_D(1)$='00' and so str='001'∥'000x'='001000x'. At block 322, $f_D(1)$=0, causing the loop at block 310 to stop repeating. Accordingly, the function 110 of FIG. 1 and method 300 of FIG. 3 returns a string of '001000x'. Since the characters in the string are coefficients of powers of two, and since x=−5, the string represents $(1*2^4)+((−5)*2^0)=16-5=11$. Since k was originally 11, the string was calculated correctly. Note that the inner loop (blocks 312-316) was not entered; accordingly, no random perturbation r was applied to t.

Note that at block 506 (FIG. 5), in several cases, t is set by subtracting an element of the set X. Since these values are negative, t may actually increase in value. Thus, on subsequent iterations of the loop at block 310 (FIG. 3) t may be in set S. Thus, the inner loop is traveled, which results in addition of random values to the variable t. This results in a string str which is associated with a scalar k', rather than k.

Having obtained the string variable str at block 324 of FIG. 3, the scalar-point calculation module 104 of FIG. 1 calculates the value Q=kP, i.e. the product of the scalar k and elliptic curve point P. In one example, the calculation performed by module 104 is made according to method 600 seen in FIG. 6, which can be implemented in software 602, firmware, hardware (e.g. an ASIC) or in any media and/or configuration, as required and/or desired.

At block 604, the result Q is initially set to equal the point P. At block 606, a loop is entered and repeated for an index i=len−4 down to 0. Recall that len was a variable set to equal the length of the string str, which was created by the RSF function 110 of FIG. 1. The index i moves from len−4 (rather than len without subtraction of 4) to 0 because of two contributing factors. First, since the final loop index is zero, rather than one, the value of len is decremented by one. Second, the value of len is decremented by an additional three, because the leading '001' is removed. For example, consider that the algorithm 300 continues until t=0 (see block 310 of FIG. 3). That means that the prior value of t is 1. This is shown by referring to block 506 of FIG. 5, where it should be noted that t is set to (t−1)/8 if t mod 8 is 1. Thus, if the prior value of t is 1, then the subsequent value of t is 0. However, to get that t=1 condition, the string value str will be set to '001' (see block 406 of FIG. 4, wherein t mod 8=1 implies that str is set to '001'. Thus, to remove the '001', an additional 3 is subtracted from the variable len; i.e., the upper limit of the index i is moved from i=len−4 to 0.

Figure 6:
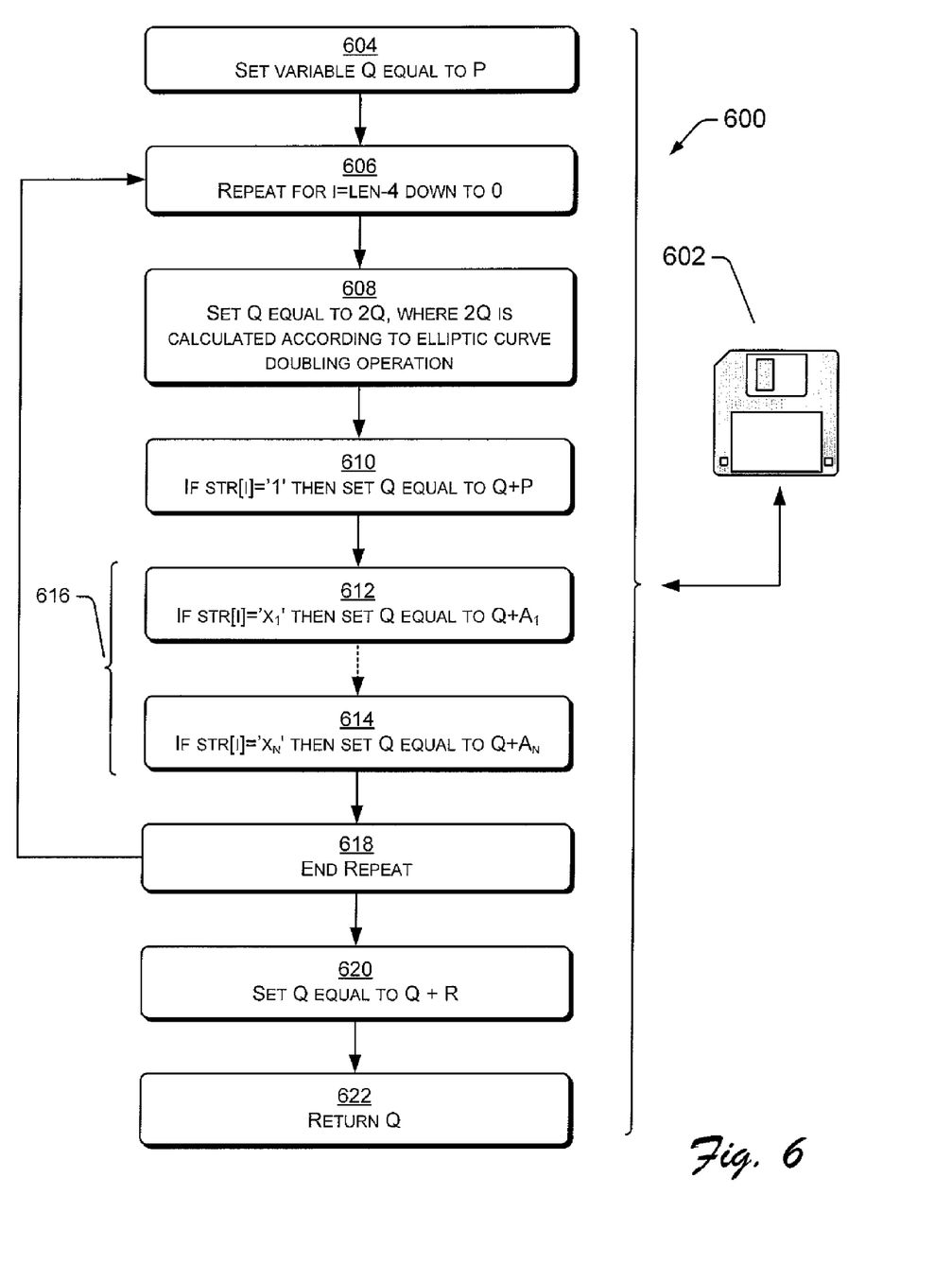
FIG. 6 illustrates an example of a method by which the string created in FIG. 3 can be used in scalar-point multiplication.

At block 608, Q is set equal to 2Q, where 2Q is calculated according to an elliptic curve doubling operation. By doubling Q, the loop focuses on the correct significant digit (in the base 2 environment). At block 610, if the $i^{th}$ position of the string str is a '1', then Q is set equal to Q+P. At block 612, if the $i^{th}$ position of the string str is a 'x' (or in the general case seen at block 612, '$x_1$'), then Q is set equal to Q+A (or in the general case seen at block 612, Q+$A_1$). (See the discussion of block 206 for information about how A, B and C, as well as $A_1 \ldots A_n$ were derived.) At block 614, if the $i^{th}$ position of the string str is a 'y' (or in the general case seen at block 614, '$x_n$'), then Q is set equal to Q+B (or in the general case seen at block 614, Q+$A_n$). Thus, at 616 it should be apparent that an arbitrary number of elements could be included in the set X, thereby resulting in an arbitrary number of $A_n$ by which Q is incremented, upon finding one of the arbitrary number of elements in the string str.

At block 618, the loop is continued according to the index i. At the conclusion of the loop, at block 620, Q is set equal to Q+R. In the example of FIG. 1, the point R is calculated (at block 214 of FIG. 2) by the random value compensation function 116 (see FIG. 1). Alternatively, the functionality can be located as desired and/or required by any particular application. The random value compensation calculator 116 compensates for random values added to the value of t at blocks 312-316 in the method 300 of FIG. 3. In method 300, where a value of t is repeated, the blocks 312-316 are performed. A random value from a set, for example the set {0, 1, 2, 3, 4, 5, 6, 7} is added to the value of t. This provides a degree of randomness to the calculation, and causes the string str returned at block 324 to be associated with a value k', rather than the scalar k. Thus, as seen at block 214, a point, arbitrarily designed by R, is calculated, based on k, k' and P. In particular a difference between k and k' is set, e.g. β=k−k'. Then, R is calculated as R=βP. Thus, R expresses the product of P and the difference between the scalar A, and the scalar k' associated with the string str. Accordingly, at block 620 R removes the randomness from calculation of the string str. Thus, the result Q (Q=kP) is the product of the scalar k and the elliptic curve point P.

EXEMPLARY COMPUTING ENVIRONMENT

Figure 7:
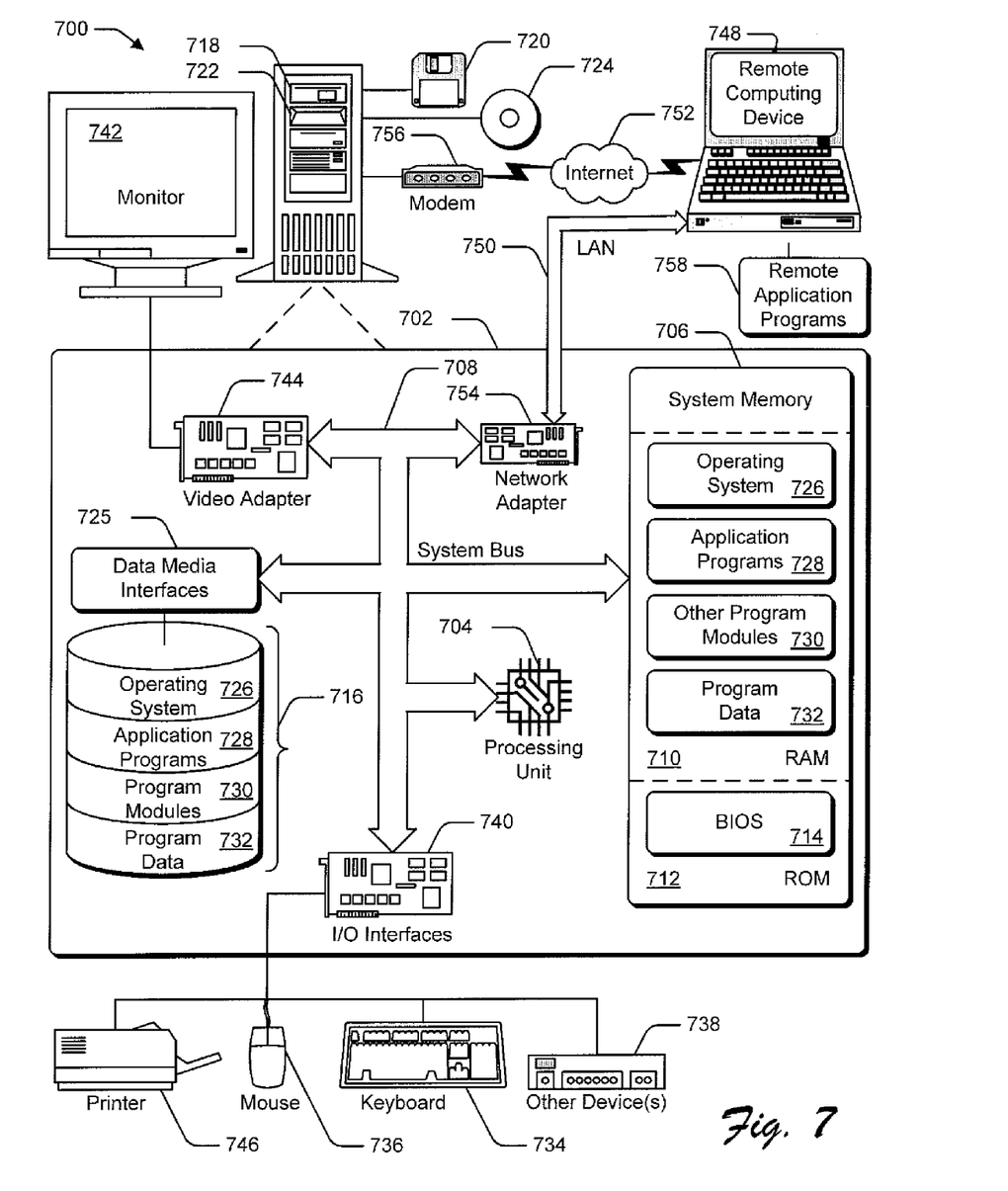
FIG. 7 illustrates an exemplary computing environment suitable for implementing the multiplication of an elliptic curve point by a scalar.

FIG. 7 illustrates an exemplary computing environment 700, illustrated for purposes of example as a computer 702, but which can be a smart card, cell phone or any other processing device. Within the computing environment 700, cryptographic operations, such as encryption, signing, authentication, key exchange hashing and others may be performed. For example, data can be encrypted for transmission, such as between the computer 702 and a remote computer 748. The transmission may be made over any network, such as the Internet 752. The encryption may be performed by an application program 728, or by the operating system 726, or other program modules 730, as indicated by the needs of a particular implementation. For example, the scalar-point multiplication module 100 (FIG. 1) can be configured within an application 728, the OS 726 or any other module 730. The encryption of data may include multiplication of a point (e.g. the point P on an elliptic curve) by a scalar (e.g. the scalar k) in a scalar-point product (e.g. Q=kP). The encryption may be performed according to the methods seen in FIGS. 2-6, by execution of the processing unit 704 using system memory 706.

The computing environment 700 includes a general-purpose computing system in the form of a computer 702. The components of computer 702 can include, but are not limited to, one or more processors or processing units 704, a system memory 706, and a system bus 708 that couples various system components including the processor 704 to the system memory 706. The system bus 708 represents one or more of any of several types of bus structures, including a memory bus or memory controller, a peripheral bus, a Peripheral Component Interconnect (PCI) bus, an accelerated graphics port, and a processor or local bus using any of a variety of bus architectures.

Computer 702 typically includes a variety of computer readable media. Such media can be any available media that is accessible by computer 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 can also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 725. Alternatively, the hard disk drive 716, magnetic disk drive 718, and optical disk drive 722 can be connected to the system bus 708 by a SCSI interface (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media that can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating systems 726, one or more application programs 728, other program modules 730, and program data 732 (or some combination thereof) may include an embodiment of a caching scheme for user network access information.

Computer 702 can include a variety of computer/processor readable media identified as communication media. Communication media typically embodies computer readable instructions, data structures, program modules, or other data, and includes any information delivery media. Combinations of any of the above are also included within the scope of computer readable media.

A user can enter commands and information into computer system 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 that can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer system 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

CONCLUSION

Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts.

As used herein, a computer and/or processor-readable medium can be any means that can contain or store instructions for use by or execution by a processor. A processor-readable medium can be, without limitation, an electronic, magnetic, optical, electromagnetic, infrared, or semiconductor system, apparatus or device. More specific examples of a processor-readable medium include, among others, a portable computer diskette, a random access memory (RAM), a read-only memory (ROM), an erasable programmable-read-only memory (EPROM or Flash memory), a rewritable compact disc (CD-RW), and a portable compact disc read-only memory (CDROM).

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

The invention claimed is:

1. A computerized method comprising:
operating a processor, within a computing environment, to execute instructions stored on a memory within the computing environment, to multiply a point P on an elliptic curve by a scalar value k, to thereby obtain a scalar-point product Q for use in crytographic systems, wherein the operating performs the steps comprising:
selecting a set of random integers, wherein the set comprises at least one integer selected randomly;
configuring a string str based in part on the set of random integers, wherein configuring the string str, generates a random sparse format of the scalar k, indicated by k', which differs from k due to the randomness introduced wherein generating the random sparse format of the scalar comprises:
setting the string variable str to a null string, setting a variable S to be the empty set, and initializing a temporary variable T to the scalar k;
within a first loop, repeating until T=0;
within a second loop nested in the first loop, repeating while T is in set S;
choosing R randomly from a set of integers;
setting T equal to T+R;
setting S equal to S union {T};
setting str equal to a function of T concatenated to str; and
setting T equal to a function of T; and
returning str; and
calculating the scalar-point product Q of the scalar k and the point P based on the string str, wherein the calculating removes effects of the randomness introduced to the string str from the result of Q=k'P in part by establishing a variable $\beta$=k−k' and calculating a point R as R=$\beta$P, wherein R is added to Q to remove effects of the randomness to derive Q=kP.

2. The computerized method of claim 1, wherein selecting the set of random integers comprises:
selecting at least one integer for inclusion in the set of random integers, wherein the at least one integer selected is negative, having a magnitude in a range bounded by 2 and the cube root of the scalar.

3. The computerized method of claim 1, wherein configuring the string based in part on the random set comprises:

sequencing zero, one, and elements of the set of random integers within the string, wherein the string represents coefficients of powers of two.

4. The computerized method of claim 1, wherein calculating the scalar-point product based on the string comprises:
parsing the string for ones and elements of the set of random integers; and
incrementing a return value by the point, and by points equal to the elements of the set of random integers times the point, as indicated by the parsing.

5. The computerized method of claim 1, wherein calculating the scalar-point product based on the string comprises:
adding a point to a point created by parsing the string, wherein the point added to the point created is based on a difference between a value associated with the string and the scalar.

6. A computerized method for multiplying a point P by a scalar k on an elliptic curve, the method comprising:
operating a processor, within a computing environment, to execute instructions stored on a memory within the computing environment, to multiply a point P on an elliptic curve by a scalar value k, to thereby obtain a scalar-point product Q for use in cryptographic systems, wherein the operating performs the steps comprising:
selecting a set of random integers;
configuring a string str in an iterative manner to generate a random sparse format of the scalar, wherein some iterations insert characters based on the set of random integers into the string str, and wherein some iterations include addition of a random number to intermediate values of the scalar, wherein generating the random sparse format of the scalar comprises:
setting the string variable str to a null string, setting a variable S to be the empty set, and initializing a temporary variable T to the scalar k;
within a first loop, repeating until T=0;
within a second loop nested in the first loop, repeating while T is in set S;
choosing R randomly from a set of integers;
setting T equal to T+R;
setting S equal to S union {T};
setting str equal to a function of T concatenated to str; and
setting T equal to a function of T; and
returning str; and
calculating Q=kP based on the string, making an adjustment to compensate for the random numbers added, wherein the adjusting removes effects of the randomness introduced to the string str from the result of Q=k'P in part by establishing a variable β=k−k' and calculating a point R as R=βP, wherein R is added to Q to remove effects of the randomness to derive Q=kP.

7. The computerized method of claim 6, wherein configuring the string comprises:
determining, with each iteration, at least one least character for concatenation to the string, wherein the determination is based on an intermediate value of the scalar; and
changing, with each iteration, the intermediate value of the scalar, wherein the change may be based on values within the set of random integers.

8. The computerized method of claim 6, wherein configuring the string comprises:
checking to see whether an intermediate value of the scalar is repeated; and
if a repeated value is found, incrementing the repeated intermediate value by a random number.

9. The computerized method of claim 6, wherein calculating Q=kP based on the string comprises:
examining the string for characters associated with the set of random integers; and
upon discovery of such a character, adding a point, derived by multiplying a value associated with the discovered character by P, to an intermediate value of Q.

10. The computerized method of claim 6, wherein the adjustment to compensate for the random numbers added adjusts the value Q=kP by a multiple of P determined by a difference between the scalar k and a value associated with the string.

11. A computerized method for multiplying a point P by a scalar k, the method comprising:
operating a processor, within a computing environment, to execute instructions stored on a memory within the computing environment, to multiply the point P, defined on an elliptic curve, by the scalar value k, to thereby obtain a scalar-point product Q for use in cryptographic systems, wherein the operating performs the steps comprising:
selecting a set of random integers, wherein integers from within the set of random integers are used as characters;
configuring a string str of coefficients through iterations by calculating intermediate values of the scalar based on modulo operations and integers from the set of random integers and concatenating characters to the string based on the modulo operations, wherein some of the characters concatenated comprise characters associated with the integers from within the set of random integers, and some of the iterations involve adding a random number to an intermediate value of the scalar;
calculating Q=kP based on the string; and
adjusting Q=kP to compensate for the random numbers added, wherein the adjusting removes effects of the randomness introduced to the string str from the result of Q=k'P in part by establishing a variable β=k−k' and calculating a point R as R=βP, wherein R is added to Q to remove effects of the randomness to derive Q=kP.

12. The computerized method of claim 11, wherein the iterations having the same intermediate value of the scalar trigger addition of the random number to the intermediate value of the scalar.

13. The computerized method of claim 11, wherein configuring the string comprises:
generating a random sparse format of the scalar k.

14. The computerized method of claim 11, wherein
the set of random integers comprises three random integers; and
the random number added to the intermediate value of the scalar is selected from a set of eight integers.

15. The computerized method of claim 11, wherein
the set of random integers comprises three random integers; and
iterations calculating string characters and changing intermediate scalar values are based on mod 8 calculations.

16. The computerized method of claim 11,
wherein configuring the string of coefficients comprises:
performing iterations involving setting a string-returning function equal to:
'000' if t mod 8=0;
'001' if mod 8=1;
'0' if t mod 8=2;
'00x' if t mod 8=3;
'00' if t mod 8=4;
'00y' if t mod 8=5;
'0x0' if t mod 8=6;
'00z' if t mod 8=7;

wherein x, y and z represent elements of the set of random integers, and wherein t is an intermediate value of the scalar k; and wherein calculating Q=kP based on the string comprises:
  performing iterations involving setting an integer-returning function equal to:
  $t/8$ if t mod 8=0;
  $(t-1)/8$ if t mod 8=1;
  $t/8$ if t mod 8=0;
  $(t-1)/8$ if t mod 8=1;
  $t/2$ if t mod 8=2;
  $(t-x)/8$ if t mod 8=3;
  $t/4$ if t mod 8=4;
  $(t-y)/8$ if t mod 8=5;
  $(t-2x)/8$ if t mod 8=6;
  $(t-z)/8$ if t mod 8=7.

\* \* \* \* \*

UNITED STATES PATENT AND TRADEMARK OFFICE
CERTIFICATE OF CORRECTION

PATENT NO. : 7,664,258 B2  
APPLICATION NO. : 11/275372  
DATED : February 16, 2010  
INVENTOR(S) : Ramarathnam Venkatesan et al.

Page 1 of 1

It is certified that error appears in the above-identified patent and that said Letters Patent is hereby corrected as shown below:

In column 3, line 11, after "(x0.75)" insert -- . --.

In column 10, line 30, in Claim 1, delete "crytographic" and insert -- cryptographic --, therefor.

In column 12, line 60, in Claim 16, after "'001' if" insert -- t --.

In column 13, lines 7-8, in Claim 16, below "equal to:" delete "t/8 if t mod 8=0; (t-1)/8 if t mod 8=1;".

Signed and Sealed this
Eighth Day of February, 2011

David J. Kappos
*Director of the United States Patent and Trademark Office*